(12) United States Patent
Shiraishi et al.

(10) Patent No.: US 7,336,250 B2
(45) Date of Patent: Feb. 26, 2008

(54) METHOD AND APPARATUS FOR DRIVING LIQUID-CRYSTAL OPTICAL-MODULATION DEVICE

(75) Inventors: Atsushi Shiraishi, Sayama (JP); Masafumi Ide, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 0 days.

(21) Appl. No.: 11/367,319

(22) Filed: Mar. 6, 2006

(65) Prior Publication Data

US 2006/0197729 A1    Sep. 7, 2006

(30) Foreign Application Priority Data

Mar. 4, 2005  (JP)  ............... 2005-061580

(51) Int. Cl.
G09G 3/36   (2006.01)
(52) U.S. Cl. ............... 345/89; 345/87; 345/96; 345/209; 345/690
(58) Field of Classification Search .......... 345/87–100, 345/204–215, 690–697; 349/100–121; 359/159–181
See application file for complete search history.

(56) References Cited

U.S. PATENT DOCUMENTS

| | | | | |
|---|---|---|---|---|
| 5,357,317 A | * | 10/1994 | Fukuchi et al. | 399/39 |
| 5,519,411 A | * | 5/1996 | Okada et al. | 345/89 |
| 5,627,559 A | * | 5/1997 | Tsuboyama et al. | 345/97 |
| 5,986,736 A | * | 11/1999 | Kodera et al. | 349/134 |
| 6,326,943 B1 | * | 12/2001 | Inoue et al. | 345/101 |
| 6,879,431 B2 | * | 4/2005 | Ide | 359/315 |
| 7,019,724 B2 | * | 3/2006 | Ide | 345/87 |
| 7,123,796 B2 | * | 10/2006 | Steckl et al. | 385/40 |
| 2004/0066363 A1 | * | 4/2004 | Yamano et al. | 345/98 |

FOREIGN PATENT DOCUMENTS

JP    59-157572 A    9/1984

* cited by examiner

Primary Examiner—Vijay Shankar
(74) Attorney, Agent, or Firm—Sughrue Mion, PLLC

(57) ABSTRACT

For statically driving a liquid-crystal optical-modulation device, an alternating electric field produced by a drive signal is applied to a liquid crystal included therein. In a first period in which the alternating electric field has a first polarity, the drive signal is pulse-width modulated based on a first ON-voltage and a first OFF-voltage. In a second period in which the alternating electric field has a second polarity, the drive signal is pulse-width modulated based on a second ON-voltage and a second OFF-voltage.

5 Claims, 11 Drawing Sheets

METHOD AND APPARATUS FOR DRIVING LIQUID-CRYSTAL OPTICAL-MODULATION DEVICE

BACKGROUND OF THE INVENTION

1. Field of the Invention

The present invention relates to a technology for driving a liquid-crystal optical-modulation device.

2. Description of the Related Art

In recent years, an optical-modulation device including a liquid crystal (hereinafter, "liquid-crystal optical-modulation device) has been attracting much attention. The liquid-crystal optical-modulation device is an effective device to be used in a variable optical attenuator (VOA). A driving method of the liquid-crystal optical-modulation device is similar to that of a liquid-crystal display. As the driving method of the liquid crystal display, a static driving method and a matrix driving method are used.

In the static driving method, as shown in FIG. 1, a voltage is applied to each pixel by a common signal 1 and a segment signal 2. In the matrix driving method, as shown in FIG. 2, plural pixels 4 are driven by a pulse signal 5 in the time-division manner. The matrix driving method is suitable for a two-dimensional display device such as a liquid-crystal display. However, the matrix driving method is rarely applied to the liquid-crystal optical-modulation device due to various restrictions.

To simplify the structure of a driving circuit, a drive signal to be applied to the liquid crystal should be a pulse signal. For liquid crystals, a pulse height modulation (PHM) and a pulse width modulation (PWM) are applicable. In consideration of a structure and a performance of the liquid-crystal optical-modulation device, the static driving method applying the pulse width modulation is suitable for the liquid-crystal optical-modulation device. With the pulse width modulation, a digital control can be easily performed, and a circuit size and power consumption are smaller than the pulse height modulation.

A technique of the static driving with the pulse width modulation is disclosed in, for example, Japanese Patent Application Laid-Open No. S59-157572. In the technique, a common signal having binary voltage levels and a segment signal having the same voltage levels as the common signal are applied to a common electrode and a segment electrode arranged opposite to each other across a pixel. Thus, a drive signal having ternary voltage levels is applied to a liquid crystal. FIG. 3 illustrates waveforms of a common signal C, a segment signal S, and a drive signal P in this driving technique.

As shown in FIG. 3, the drive signal P to be applied to the liquid crystal has a positive polarity in a period T1 in which an alternating electric field has one polarity, and has a negative polarity in a period T2 in which the alternating electric field has another polarity. If a direct-current component is included in the drive voltage, the life of the liquid crystal is shortened. In this driving method, an effective voltage to be applied to the liquid crystal of each pixel changes according to a pulse width of a corresponding segment signal, thereby changing a phase of light passing through the liquid crystal.

However, the driving method shown in FIG. 3 produces a non-zero period in which the applied voltage is not zero and a zero period in which the applied voltage is zero. A long zero period causes a change of the condition of the liquid crystal and a decrease of the phase shift amount of the light. In the next non-zero period, however, the phase shift amount increases. Thus, a phenomenon (waveform response) that decreases and increases the phase shift amount is repeated.

In addition, the conventional driving method shown in FIG. 3 has a problem in which resolution becomes insufficient in a range in which a characteristic of the liquid-crystal optical-modulation device significantly changes. FIG. 4 illustrates a relation between the applied voltage (effective voltage) and the phase of light passing through the liquid crystal. As shown in FIG. 4, a characteristic curve of the liquid-crystal optical-modulation device is not linear and includes an abrupt change in the slope. In the characteristic curve shown in FIG. 4, when effective voltages of the driving voltage to be applied to the liquid crystal are VA, VB, VC, and VD, phases of light are $\phi A$, $\phi B$, $\phi C$, and $\phi D$, respectively.

In an example shown in FIG. 4, the slope of the characteristic curve between $\phi B$ and $\phi C$ is larger than that between $\phi A$ and $\phi B$. A pulse width generated in the pulse width modulation performed by a digital circuit is constant throughout the characteristic curve. Therefore, the phase shift amount corresponding to one pulse width in a range in which the slope is large represents the minimum resolution of the liquid-crystal optical-modulation device.

FIG. 5 illustrates waveforms of drive signals used in the pulse width modulation to obtain effective voltages VA, VB, VC, and VD. A drive signal PA corresponds to the effective voltage VA, and with the effective voltage VA, the phase shift amount becomes the minimum. A drive signal PD corresponds to the effective voltage VD, and with the effective voltage VD, the phase shift amount becomes the maximum.

A drive signal PC corresponds to the effective voltage VC, which corresponds to the range in which the slope of the characteristic curve is the largest. A drive signal PB corresponds to the effective voltage VB, and has a pulse width one minimum width smaller than a pulse width of the drive signal PC as shown in FIG. 5. It is impossible to generate a pulse having a pulse width between pulse widths of the drive signal PB and the drive signal PC. In other words, it is impossible to generate a voltage between the effective voltages VB and VC in the characteristic curve shown in FIG. 4. Therefore, the minimum resolution of the liquid-crystal optical-modulation device is a phase difference between $\phi B$ and $\phi C$. To obtain higher resolution, a large scale circuit and a high clock frequency are necessary, thereby increasing power consumption.

Furthermore, characteristics of liquid crystal change due to a factor such as a temperature change. In the pulse width modulation, influence of such factor is calculated in advance to be reflected in modulation data. Thus, a variation due to the characteristic change is corrected to finely adjust the pulse width. However, such calculation is very complicated, and a real-time calculation is difficult to be achieved with a simple system.

With such reason, in a general liquid-crystal driving device, the variation due to the characteristic change is corrected by controlling amplitude of a drive signal. However, if this correction method is applied to the conventional driving method shown in FIG. 3, a voltage exceeds a withstand voltage of a segment driving circuit formed in an integrated circuit (IC), or power consumption increases, because the common signal and the segment signal have the same amplitude.

SUMMARY OF THE INVENTION

It is an object of the present invention to at least solve the above problems in the conventional technology.

A method according to an aspect of the present invention is a method of statically driving a liquid-crystal optical-modulation device by applying an alternating electric field to a liquid crystal that is included in the liquid-crystal optical-modulation device and sandwiched by a pair of electrodes. The alternating electric field is produced by a drive signal that is pulse-width modulated based on modulation data. In a first period in which the alternating electric field has a first polarity, the drive signal is pulse-width modulated based on a first ON-voltage and a first OFF-voltage. In a second period in which the alternating electric field has a second polarity, the drive signal is pulse-width modulated based on a second ON-voltage and a second OFF-voltage that respectively differ from the first ON-voltage and the first OFF-voltage.

An apparatus according to another aspect of the present invention is an apparatus for statically driving a liquid-crystal optical-modulation device by applying an alternating electric field to a liquid crystal that is included in the liquid-crystal optical-modulation device and sandwiched by a common electrode and a segment electrode. The alternating electric field is produced by a drive signal that is pulse-width modulated based on modulation data. The apparatus includes a segment driving circuit, a common driving circuit, a control circuit, and an analog power-source circuit. The segment driving circuit generates, based on the modulation data, a segment signal to be applied to the segment electrode. The common driving circuit generates, based on a polarity signal, a common signal to be applied to the common electrode. The control circuit provides a clock signal for timing control of pulse width modulation to the segment driving circuit, and provides the polarity signal to the common driving circuit. The analog power-source circuit includes: a first direct-current power source that provides a first direct-current voltage for voltage amplification to the segment driving circuit; a second direct-current power source that provides a second direct-current voltage for voltage amplification to the common driving circuit, the second direct-current voltage being higher than the first direct-current voltage by a bias voltage; and a third direct-current power source that provides a third direct-current voltage for voltage amplification to the common driving circuit, the third direct-current voltage being lower than the first direct-current voltage by the bias voltage.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
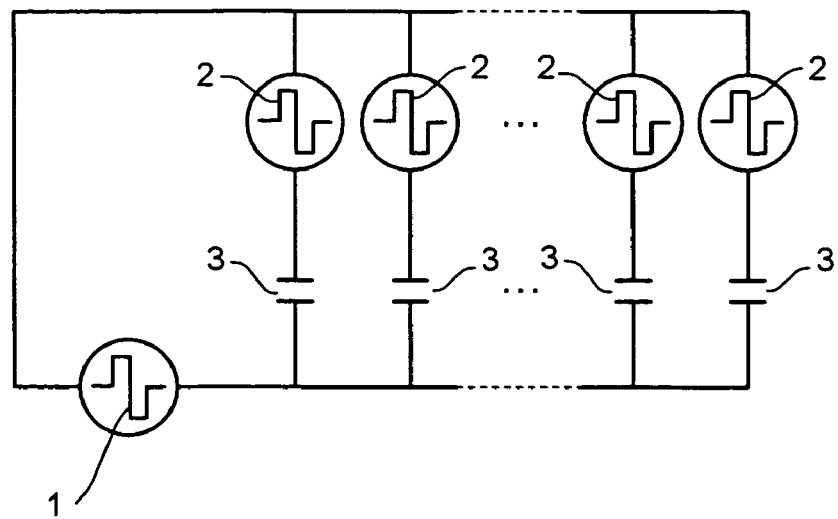
FIG. 1 is a schematic for illustrating a static driving method.
Figure 2:
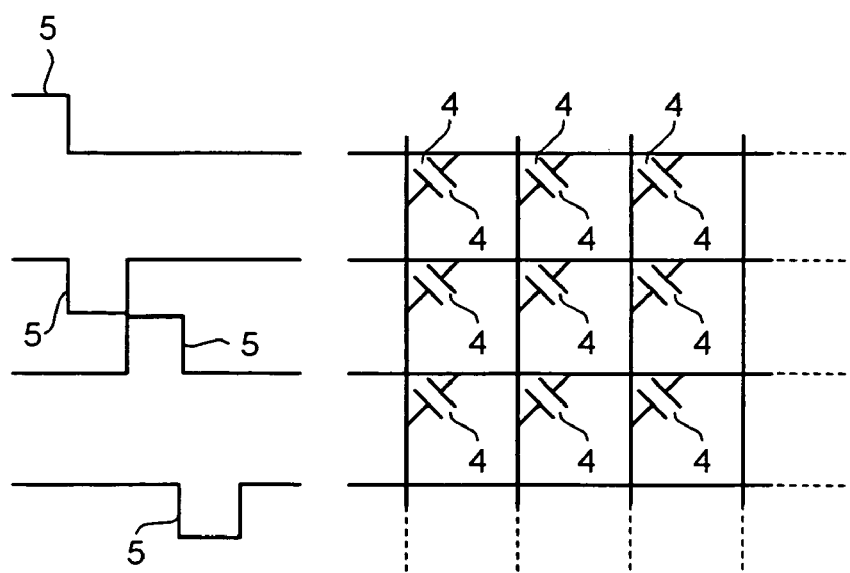
FIG. 2 is a schematic for illustrating a matrix driving method.
Figure 3:
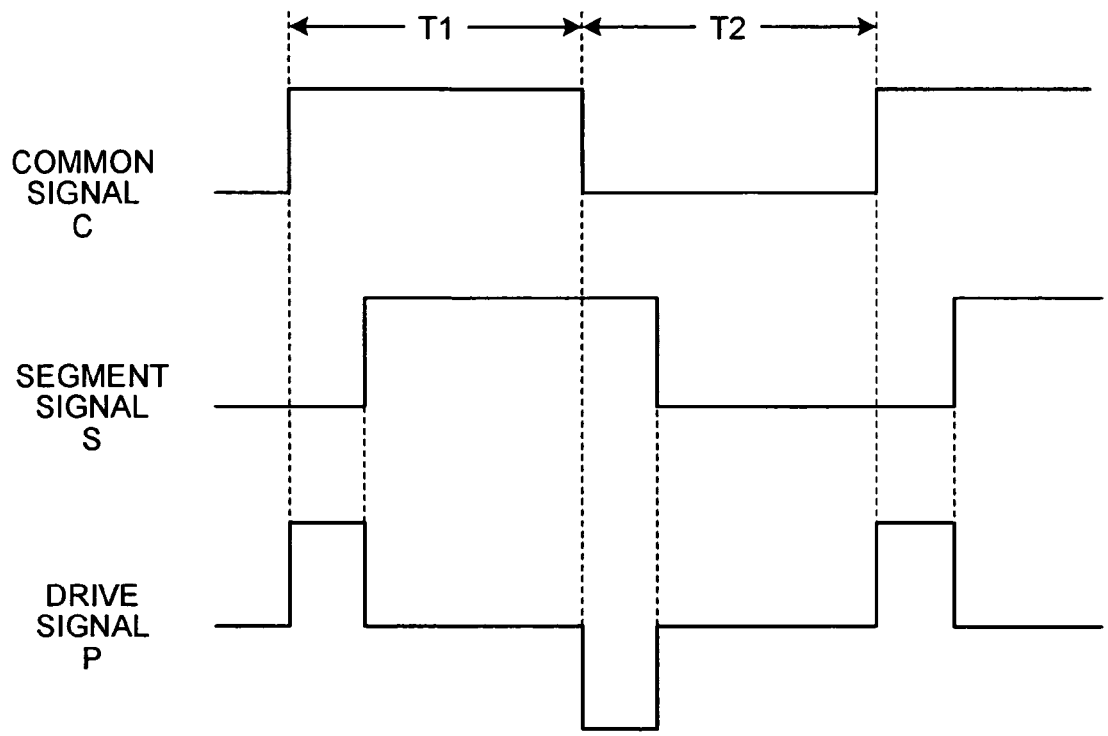
FIG. 3 is a schematic for illustrating waveforms of signals in the static driving method.

Exemplary embodiments according to the present invention will be explained in detail below with reference to the accompanying drawings. Like reference characters refer to like components throughout the drawings and explanation of the embodiments, and the same explanation will be omitted.

Figure 6:
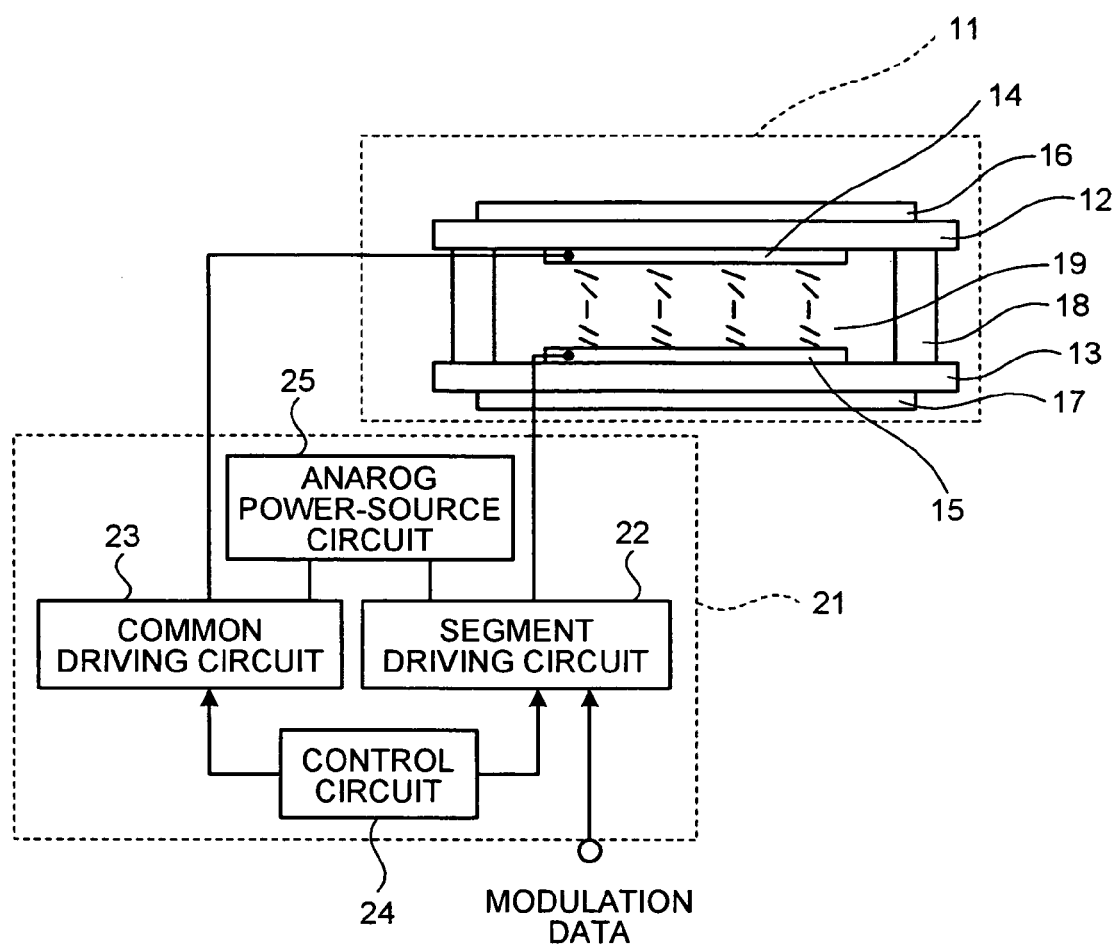
FIG. 6 is a schematic of a liquid-crystal optical modulation system according to an embodiment of the present invention.

FIG. 6 is a schematic of a liquid-crystal optical-modulation system according to an embodiment of the present invention. As shown in FIG. 6, a liquid-crystal optical-modulation device 11 includes a liquid crystal 19 between a pair of substrates 12 and 13 formed with glass or silicon. A common electrode 14 and a segment electrode 15 are arranged on surfaces of the substrates 12 and 13 respectively such that the common electrode 14 and the segment electrode 15 face each other. Polarizing films 16 and 17 are arranged on the substrates 12 and 13 on opposite surfaces to the surfaces on which the common electrode 14 and the segment electrode 15 are arranged. The liquid crystal is sealed in a space between the substrates 12 and 13 with sealing materials 18.

A driving unit 21 includes a segment driving circuit 22 that generates a segment signal to be applied to the segment electrode 15, a common driving circuit 23 that generates a common signal to be applied to the common electrode 14, a control circuit 24, an analog power-source circuit 25, and a digital power-source circuit (not shown). The control circuit 24 provides, to the segment driving circuit 22, a clock signal for a timing control in the pulse width modulation. The control circuit 24 also provides a polarity signal to the common driving circuit 23.

The analog power-source circuit 25 provides, to the segment driving circuit 22 and the common driving circuit 23, a direct voltage for voltage amplification. The segment driving circuit 22 and the common driving circuit 23 respectively generate the segment signal and the common signal having voltage levels suitable for driving the liquid crystal based on the direct voltage.

Figure 7:
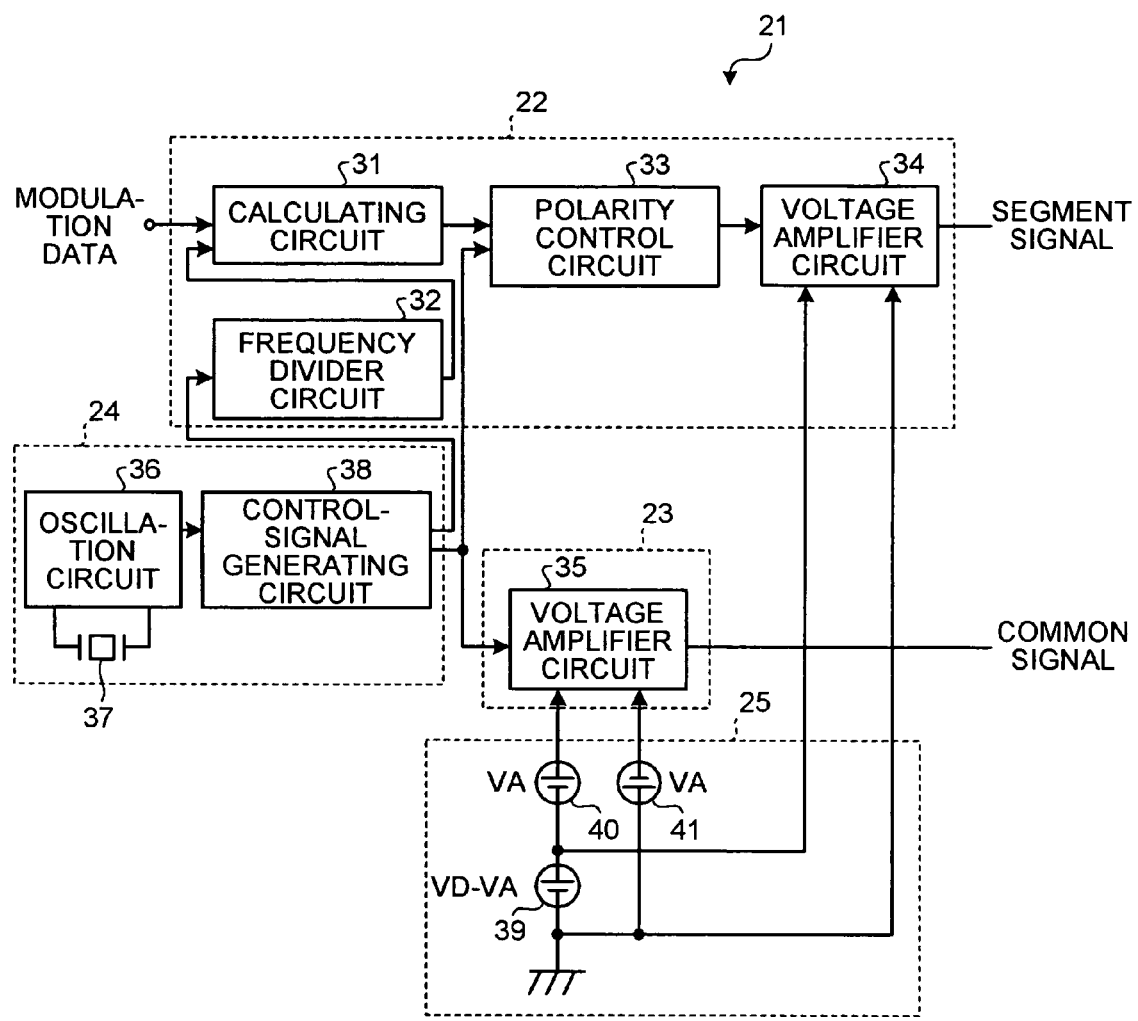
FIG. 7 is a block diagram of a driving apparatus in the liquid-crystal optical-modulation device.

FIG. 7 is a block diagram of the driving unit 21. The segment driving circuit 22 includes a calculating circuit 31, a frequency divider circuit 32, a polarity control circuit 33, and a first voltage amplifier circuit 34. The common driving circuit 23 includes a second voltage amplifier circuit 35. The control circuit 24 includes an oscillation circuit 36, a crystal oscillator 37, and a control-signal generating circuit 38. The analog power-source circuit 25 includes a first direct-current power source 39, a second direct-current power source 40, and a third direct-current power source 41.

The oscillator circuit 36 generates the clock signal having a high frequency. Because a stable frequency is required, a crystal oscillator is used as the oscillator circuit 36. The control-signal generating circuit 38 generates various control signals necessary for the segment driving circuit 22 and the common driving circuit 23 based on the clock signal. The controls signals include a polarity signal and a PWM clock signal for the pulse width modulation.

The polarity signal is a logic signal that is reversed when a period changes between a first period T1 during which an alternating electric field to be applied to the liquid crystal has one polarity and a second period T2 during which the alternating electric field has another polarity. The PWM clock signal provides information on timing used in the pulse width modulation with a rising edge and a falling edge of the clock signal.

The frequency divider circuit 32 divides a frequency of the PWM clock signal provided by the control-signal generating circuit 38. The calculating circuit 31 executes calculation to perform the pulse width modulation, based on the modulation data from an external source and an output signal from the frequency divider circuit 32. The modulation data indicates an amount of modulation of the liquid-crystal optical-modulation device 11, and is digital data in the present embodiment. The polarity control circuit 33 reverses an output signal from the calculating circuit 31 based on the polarity signal from the control-signal generating circuit 38. The first voltage amplifier circuit 34 converts a voltage of a logic level output from the polarity control circuit 33 into a segment voltage based on the direct voltage provided by the analog power-source circuit 25, to output as the segment signal.

An H-level of the segment signal is VD−VA, and an L-level of the segment signal is zero, where VD is the effective voltage of the drive signal with which the phase shift amount becomes the maximum, and VA is the effective voltage of the drive signal with which the phase shift amount becomes the minimum. Therefore, VD>VA is satisfied. In a binary potential level, the H-level corresponds to high level, and the L-level corresponds to low level. To the liquid crystal, the voltage of the drive signal corresponding to a difference between the common signal and the segment signal is applied.

If the liquid-crystal optical-modulation device 11 includes more than one pixel, it is necessary to generate the same number of segment signals as the number of the pixels so that the segment signal is provided to each of the pixels. In this case, the calculating circuit 31 and the polarity control circuit 33, and the first voltage amplifier circuit 34 are required for each of the segment signals. As a result, a scale of the segment driving circuit 22 becomes large. With such reason, the segment driving circuit 22 is formed in an integrated circuit of a complementary metal oxide semiconductor (CMOS). The frequency divider circuit 32 may be included in the control circuit 24.

The second voltage amplifier circuit 35 converts the polarity signal into the common signal. An H-level of the common signal is VD, and an L-level of the common signal is −VA. Because the common driving circuit 23 has a simple structure, it is not necessary to form the common driving circuit 23 in an integrated circuit. By forming the common driving circuit 23 with a single unit of transistor, a high withstand voltage can be easily obtained. The first direct-current power source 39 generates a voltage higher than a ground level, which is zero, by VD−VA. The second direct-current power source 40 generates a voltage higher than the voltage VD−VA generated by the first direct-current power source 39 by VA.

Therefore, by connecting the first direct-current power source 39 and the second direct-current power source 40 in series, a voltage higher than the ground level by VD is generated. On the other hand, the third direct-current power source 41 generates a voltage lower than the ground level by VA, which is −VA. To the second voltage amplifier circuit 35, the voltage VD is provided by the first direct-current power source 39 and the second direct-current power source 40, and the voltage −VA is provided by the third direct-current power source 41. To the first voltage amplifier circuit 34, the voltage of the ground level and the voltage VD−VA are provided by the first direct-current power source 39. The first direct-current power source 39, the second direct-current power source 40, and the third direct-current power source 41 are realized with, for example, a constant-voltage power source formed by combining a switching regulator, a charge pump, and an operational amplifier.

Figure 8:
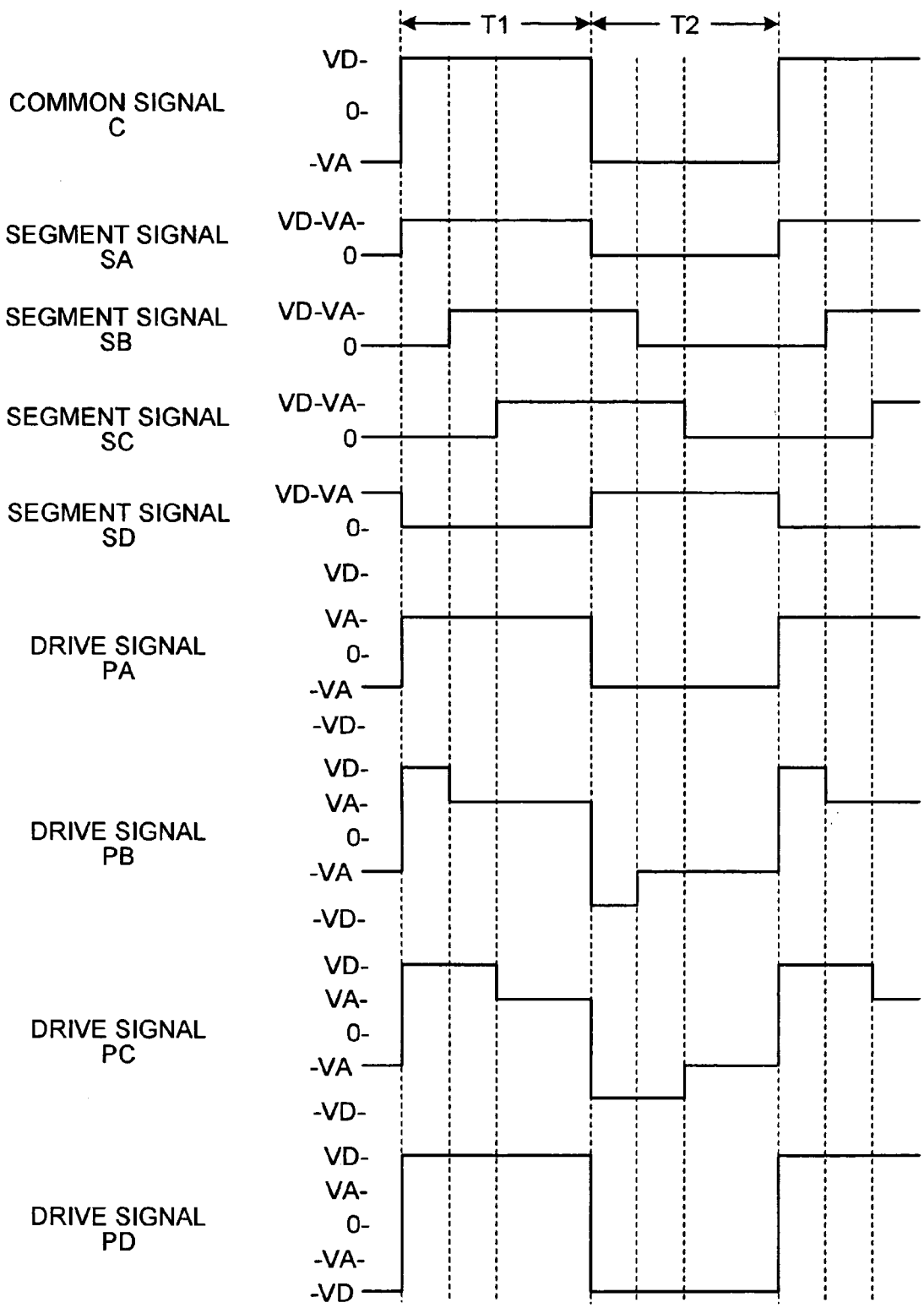
FIGS. 8, 9, 10 and 11 are schematics for illustrating waveforms of signals in a driving method according to the embodiment.

FIG. 8 illustrates waveforms of the common signal and the segment signal generated by the driving unit 21, and the drive signal to be applied between electrodes of the liquid-crystal optical-modulation device 11. Segment signals SA, SB, SC, and SD correspond to the effective voltages VA, VB, VC, and VD in the characteristic curve shown in FIG. 4, respectively. Drive signals PA, PB, PC, and PD are voltages obtained by respectively subtracting the segment signals SA, SB, SC, and SD from a common signal C. Effective voltages of the segment signals SA, SB, SC, and SD are VA, VB, VC, and VD, respectively.

As shown in FIG. 8, the common signal C reverses its polarity when the period changes between the first period T1 and the second period T2, and a voltage thereof at the H-level is VD and a voltage thereof at the L-level is −VA. The segment signals SA, SB, SC, and SD have the same duty ratio as that of the common signal, and a voltage thereof at the H-level is VD−VA and a voltage thereof at the L-level is zero.

The segment signal SA is at the H-level in the first period T1 and at the L-level in the second period T2. Therefore, a voltage of the drive signal PA is VA (=VD−(VD−VA)) in the first period T1, and is −VA (=−VA−0) in the second period T2. The drive signal PA makes the amount of pulse width modulation zero. The segment signal SD is at the L-level in the first period T1, and is at the H-level in the second period T2. Therefore, a voltage of the drive signal PD is VD (=VD−0) in the first period T1, and is −VD (=−VA−(VD−VA)) in the second period T2. The drive signal PD maximizes the amount of pulse width modulation.

The segment signals SB and SC correspond to halftones, and polarities thereof are reversed during each period of the first period T1 and the second period T2. Specifically, the segment signals SB and SC are at the L-level in a first half of the first period T1, and are at the H-level from a latter half of the first period T1 to a first half of the second period T2. And then, from a latter half of the second period T2 to the first half of a next first period T1, the segment signals SB and SC are again at the H-level. Therefore, a voltage of the drive signals PB and PC in the first half of the first period T1 is VD (=VD−0), VA (=VD−(VD−VA)) in the latter half of the first period T1, −VD (=−VA−(VD−VA)) in the first half of the second period T2, and −VA (=−VA−0) in the latter half of the second period T2.

Thus, in the present embodiment, the pulse width modulation is performed based on binary levels of a first ON-voltage VD and a first OFF-voltage VA in the first period T1, and binary levels of a second ON-voltage −VD and a second OFF-voltage −VA in the second period T2. It is preferable that the first period T1 and the second period T2 have the same duration to eliminate the direct current component in the voltage to be applied to the liquid crystal, thereby reducing an influence on the life of the liquid-crystal optical-modulation device 11.

Figure 9:
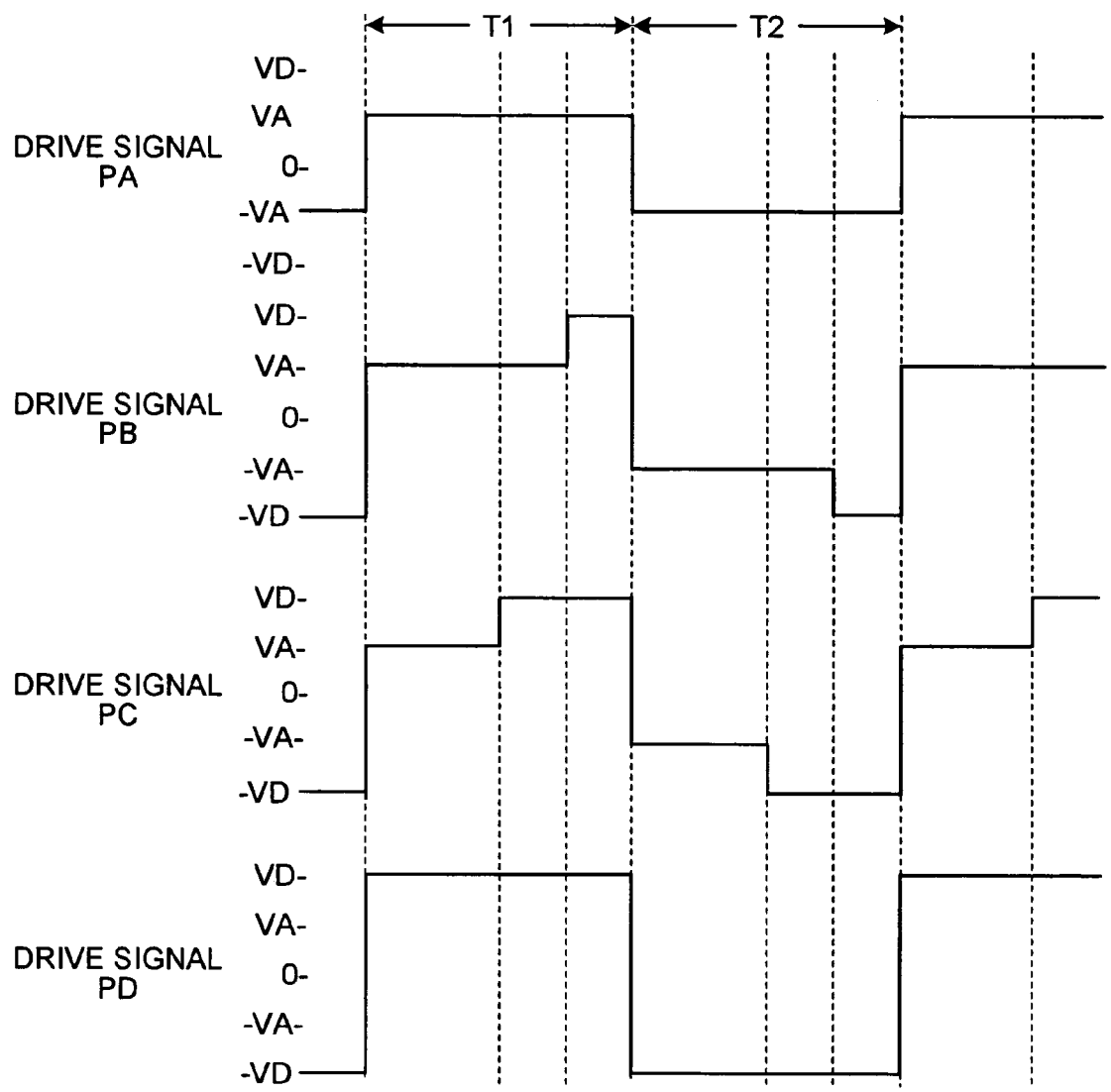

In the drive signals PA, PB, PC, and PD shown in FIG. 8, a rising edge of a pulse generating the first ON-voltage VD is set at the beginning of the first period T1, and a rising edge of a pulse generating the second ON-voltage −VD is set at the beginning of the second period T2. Alternatively, as shown in FIG. 9, a falling edge of the pulse generating the first ON-voltage VD may be set at the end of the first period T1, and a falling edge of the pulse generating the second ON-voltage −VD may be set at the end of the second period T2.

Figure 10:
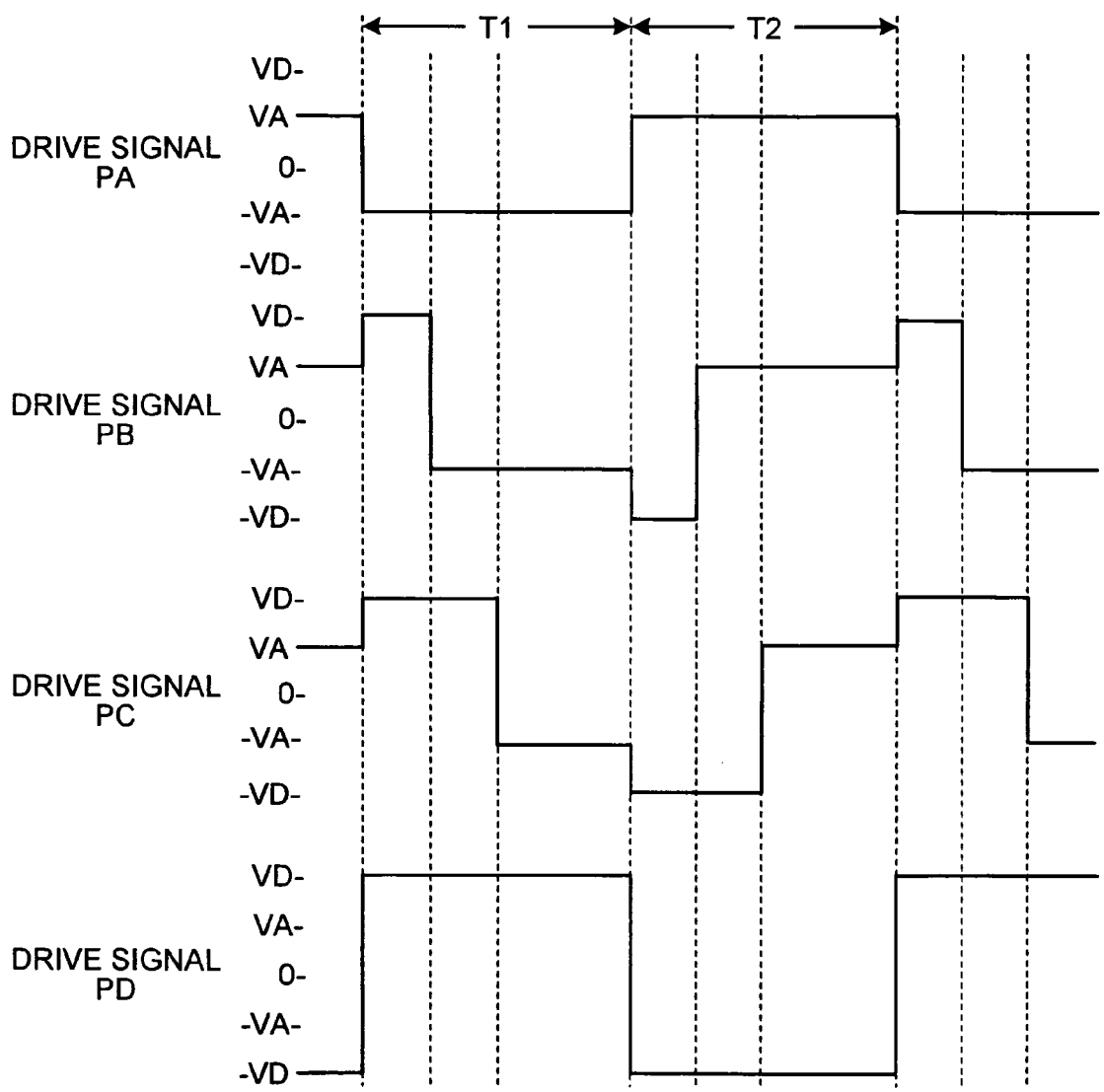
Figure 11:
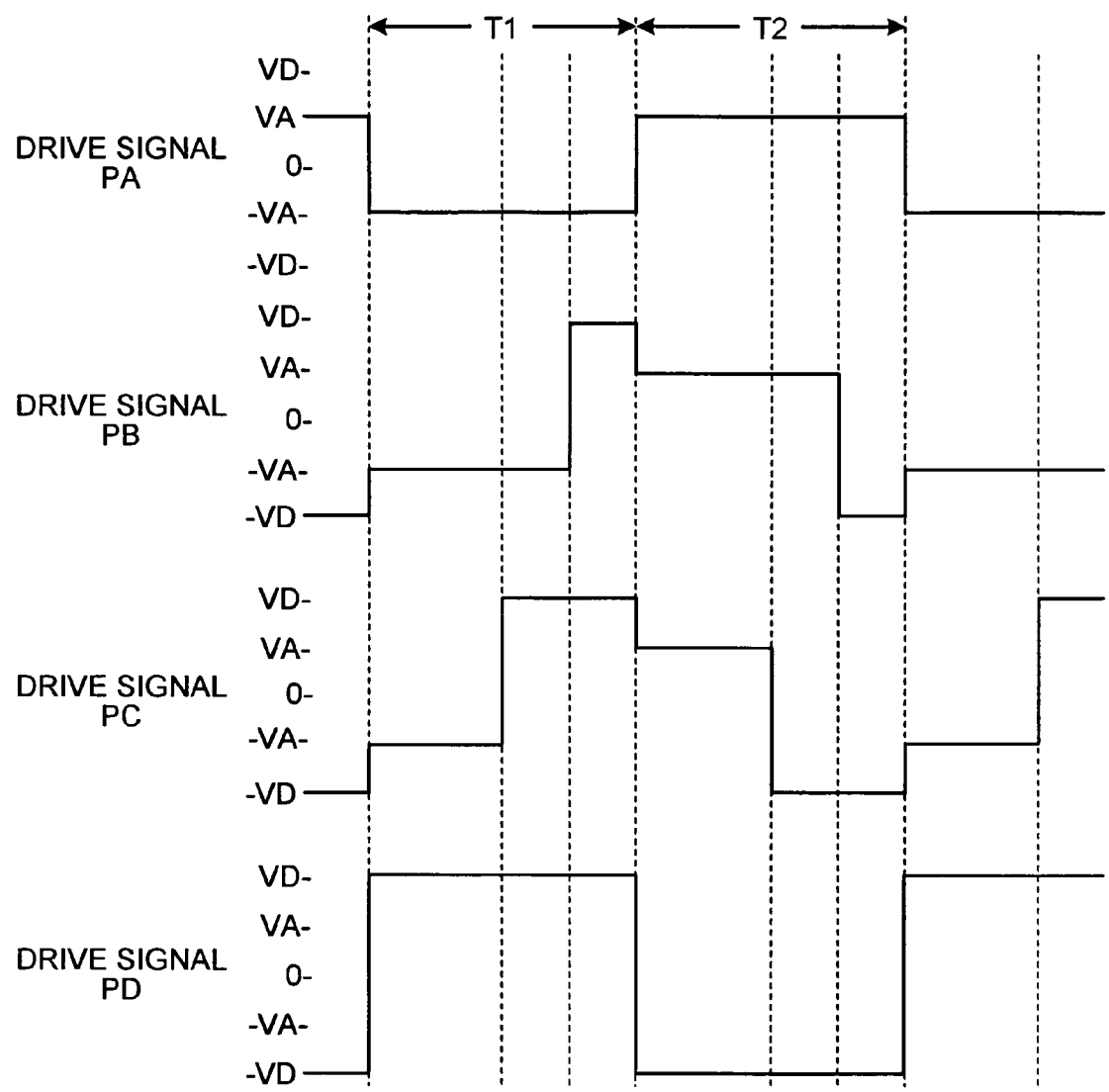

Moreover, as shown in FIGS. 10 and 11, the first OFF-voltage in the first period T1 may be set to −VA, and the second OFF-voltage in the second period T2 may be set to VA. FIG. 10 illustrates waveforms in which the rising edge of the pulse generating the first ON-voltage VD is set at the beginning of the first period T1, and the rising edge of the pulse generating the second ON-voltage −VD is set at the beginning of the second period T2. FIG. 11 illustrates waveforms in which the falling edge of each pulse is set at the end of each period.

To obtain the waveforms of the drive signals PA, PB, PC, and PD as shown in FIGS. 10 and 11, the voltages of the common signal C should be set to VD at the H-level, and to VA at the L-level, and the voltages of the segment signals SA, SB, SC, and SD should be set to VD+VA at the H-level, and to zero at the L-level. With such settings, segment voltages become higher than that shown in the waveforms in FIG. 8. Therefore, it is necessary to manufacture the segment driving circuit 22 having a higher withstand voltage than a case shown in the waveforms in FIG. 8. Therefore, to obtain a highly-integrated segment driving circuit 22, the waveforms shown in FIG. 8 is more advantageous than the waveforms shown in FIGS. 10 and 11.

Characteristics of liquid crystal are changed by a factor, such as a temperature change. Therefore, when the liquid-crystal optical-modulation device 11 is used in such an environment in which the characteristics can be changed, it is preferable that a variation due to a characteristic change is corrected.

Figure 12:
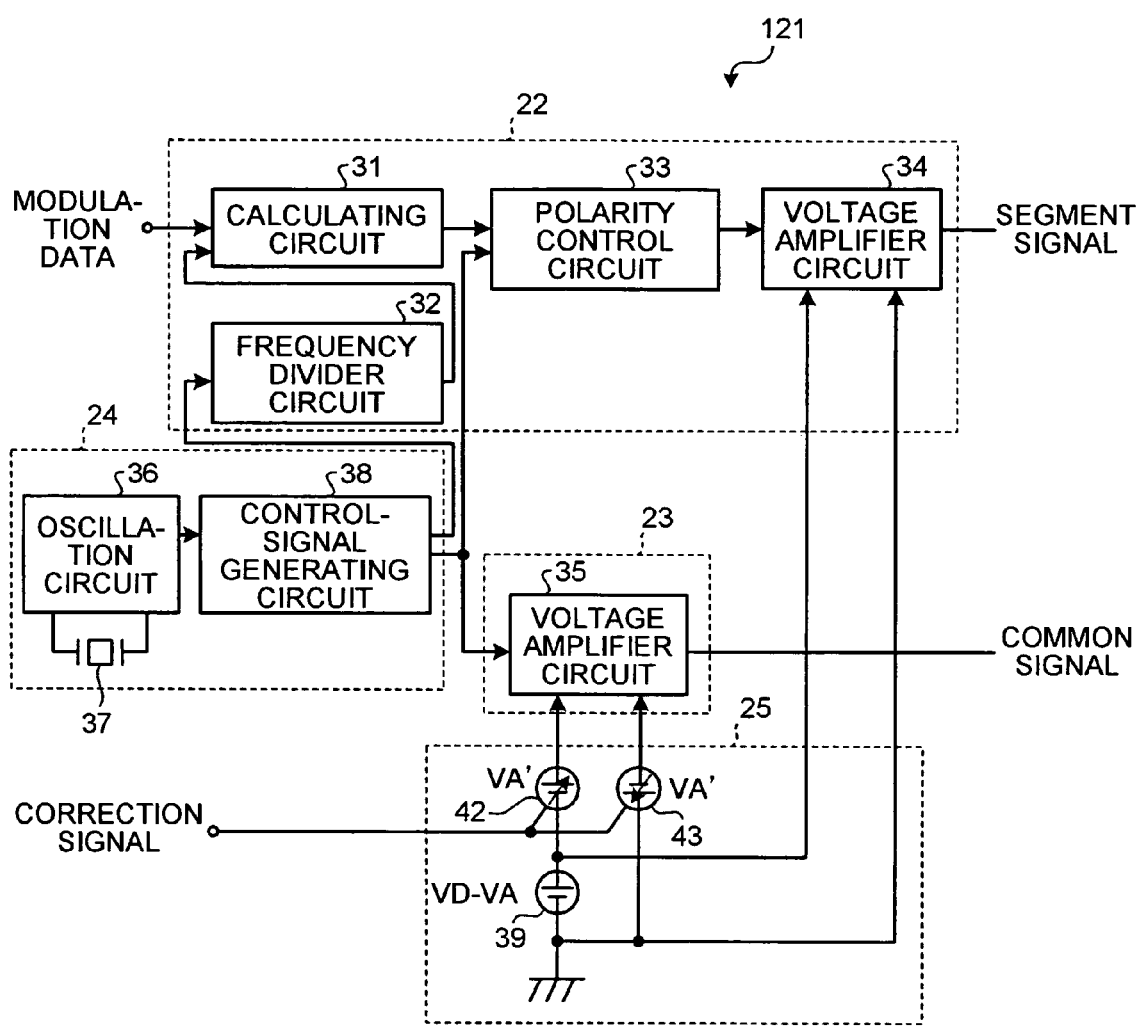
FIG. 12 is a block diagram of the driving apparatus in the liquid-crystal optical-modulation device.

FIG. 12 is a block diagram of a driving unit that corrects the variation due to the characteristic change. The second direct-current power source 40 and the third direct-current power source 41 in the analog power-source circuit 25 of the driving unit 21 shown in FIG. 7 are replaced with a second variable direct-current power-source 42 and a third variable direct-current power-source 43 in a driving unit 121 shown in FIG. 12. The second variable direct-current power-source 42 and the third variable direct-current power-source 43 are realized with, for example, a constant-voltage power source formed by combining a switching regulator, a charge pump, and an operational amplifier.

The second variable direct-current power-source 42 and the third variable direct-current power-source 43 include an input terminal for the control signals. The driving unit 121 includes an input terminal for a correction signal. The correction signal input to the driving unit 121 is provided to each input terminal of the second variable direct-current power-source 42 and the third variable direct-current power-source 43. Output voltages of the second variable direct-current power-source 42 and the third variable direct-current power-source 43 vary based on the correction signal.

Accordingly, the bias of the common signal changes based on the correction signal, thereby increasing or decreasing amplitude of the common signal. Thus, the effective driving voltage of the liquid-crystal optical-modulation device 11 is corrected. Although not shown, if an output terminal of a temperature sensor is connected to the input terminal for the correction signal, simple temperature correction can be realized.

Suppose that the liquid-crystal optical-modulation device 11 is a reflective optical modulator that is formed with a ¼ wavelength plate, or a transmissive optical modulator that is formed with a ½ wavelength plate. Relations between birefringence Δn of the liquid crystal, a thickness d of a liquid crystal layer formed between the electrodes 14 and 15, a wavelength λ of light, and an attenuation rate ATT of light passing through the liquid crystal are expressed as in Equations 1 to 4 below. Equation 1 expresses a relation when the liquid-crystal optical-modulation device 11 includes a reflective, normally-white liquid crystal. Equation 2 expresses a relation when the liquid-crystal optical-modulation device 11 includes a reflective, normally-black liquid crystal. Equation 3 expresses a relation when the liquid-crystal optical-modulation device 11 includes a transmissive, normally-white liquid crystal. Equation 4 expresses a relation when the liquid-crystal optical-modulation device 11 includes a transmissive, normally-black liquid crystal.

$$ATT = 10\log_{10}\left[\cos^2\left(\frac{2\pi\Delta nd}{\lambda}\right)\right] \quad (1)$$

$$ATT = 10\log_{10}\left[\sin^2\left(\frac{2\pi\Delta nd}{\lambda}\right)\right] \quad (2)$$

$$ATT = 10\log_{10}\left[\cos^2\left(\frac{\pi\Delta nd}{\lambda}\right)\right] \quad (3)$$

$$ATT = 10\log_{10}\left[\sin^2\left(\frac{\pi\Delta nd}{\lambda}\right)\right] \quad (4)$$

Suppose that the liquid crystal is a homogeneously-aligned liquid crystal. In the normally-black liquid crystal, the polarization direction of the polarizing film on an incident side and the polarization direction of the polarizing film on an output side are parallel, while in the normally-white liquid crystal, the polarization directions are perpendicular to each other. If the liquid crystal is a vertically-aligned liquid crystal, Equations 1 and 3 are of the normally-black liquid crystal, and Equations 2 and 4 are of the normally-white liquid crystal. The liquid crystal is a negative liquid crystal. In any of the above, an incident polarization direction and an orientation of liquid crystal molecules are set to 45 degrees. Since 2πΔnd/λ in each of the above equations indicates the phase of light, an optical attenuator can be formed using a liquid-crystal optical-modulation system having the configuration described above.

The driving method of the liquid crystal according to the present embodiment is equivalent to a driving method that applies an alternating current bias of the effective voltage VA to the liquid crystal. Thus, a period in which the driving voltage becomes zero is eliminated, thereby suppressing the waveform response without making the clock frequency high.

Figure 4:
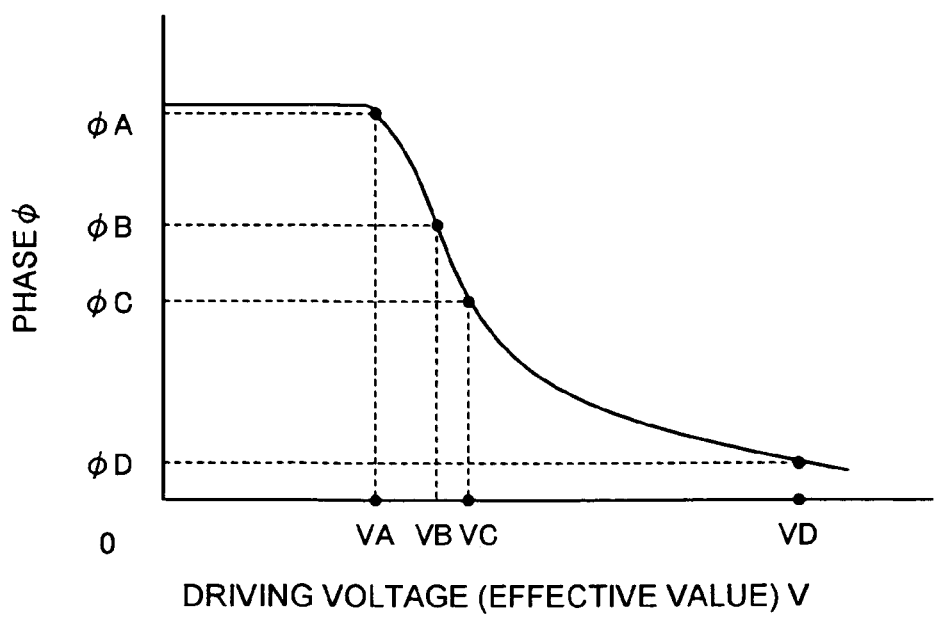
FIG. 4 is a plot of a modulation characteristic of a liquid-crystal optical-modulation device.
Figure 5:
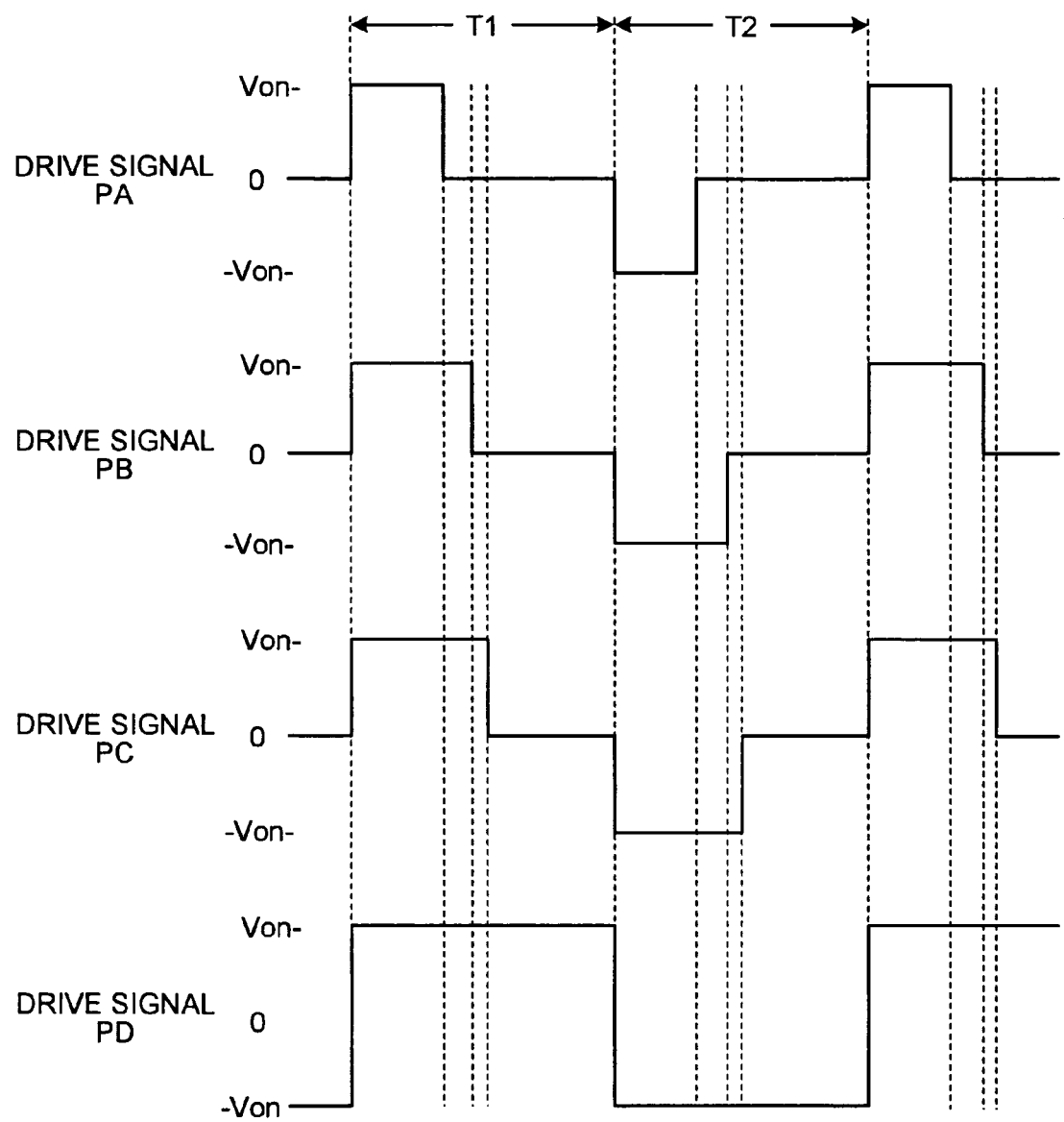
FIG. 5 is a schematic for illustrating waveforms of drive signals in the conventional static driving method.

In the conventional example shown in FIG. 5, the phase shift amount continues to be φA until the pulse width increases from zero to the minimum width corresponding to the drive signal PA (see FIG. 4). This period is an invalid period for pulse width modulation. According to the present embodiment, however, such invalid period is eliminated, thereby enabling modulation in the full dynamic range, in other words, in the entire period from when the pulse width is zero to when the pulse width reaches its maximum.

Figure 13:
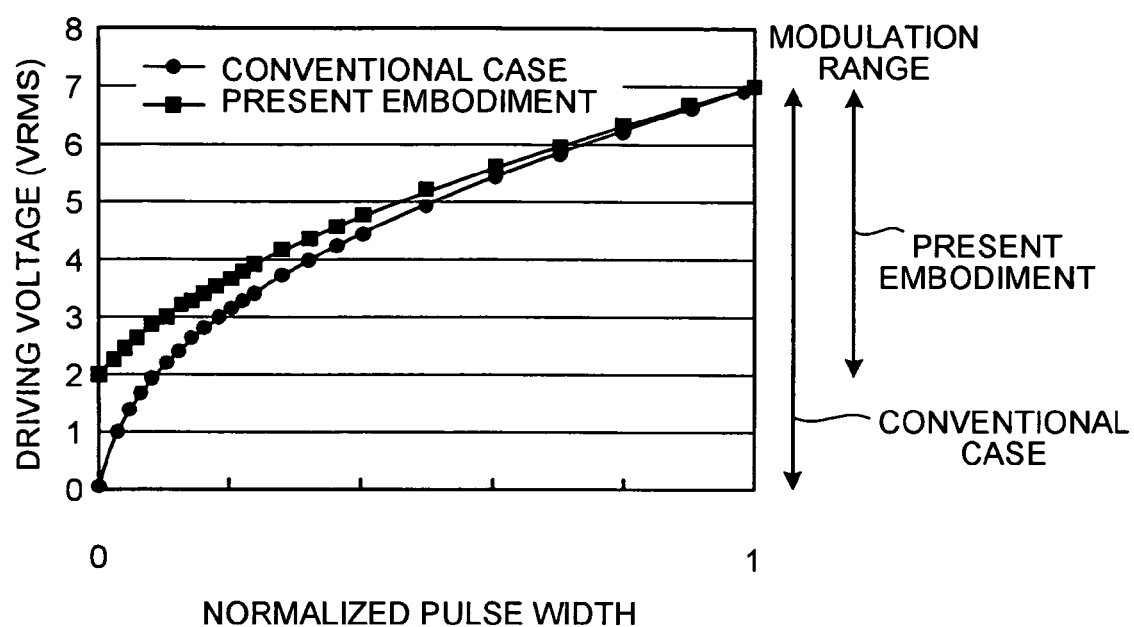
FIG. 13 is a schematic for illustrating a relation between a pulse width and a driving voltage.

FIG. 13 illustrates a relation between the pulse width and the driving voltage. As shown in FIG. 13, according to the present embodiment, a linearity of an output voltage corresponding to a change of the pulse width is improved at a low voltage region compared to the conventional example. In the conventional example, a change in voltage corresponding to the change of the pulse width is abrupt at the low voltage region. Therefore, according to the present embodiment, the change in voltage corresponding to one minimum pulse width becomes small, thereby improving the minimum resolution.

Particularly, by applying the optical modulation device according to the present embodiment to an optical attenuator used in a normally-white mode, resolution at the low voltage region, where the attenuation amount changes rapidly in the conventional example, can be improved. Since the resolution is improved without increasing a circuit scale of the driving circuit nor making the clock frequency high, power consumption does not increase.

The optical modulation device according to the present embodiment can be also applied to a phase modulation device to provide a small delay to a communication signal if a direction of an incident linear polarization is made parallel to a long axis of molecules of the liquid crystal cells. The phase modulation device as a delay element improves quality of a signal by compensating deterioration caused by a polarization element of an optical pulse due to polarization mode dispersion (PMD) generated when a high-speed signal of which speed is higher than 40 gigabits per second (Gbps) propagates through optical fibers. Therefore, with the phase modulation device, long-distance transmission can be realized.

With the driving unit 121 shown in FIG. 12, it is possible to correct the effective driving voltage of the liquid-crystal optical-modulation device 11 without changing amplitude of the segment signal. Since the voltage of the segment signal does not change, such a problem does not occur that the voltage exceeds the withstand voltage of the segment driving circuit 22, or that power consumption increases. Although amplitude of the common signal changes, since the common driving circuit 23 has a simple structure, power consumption is originally low. Therefore, influence on power consumption of the driving unit 121 is small.

The present invention is not limited to the embodiments described above, and various modifications can be made. For example, while in the embodiments, a case in which the first period T1 and the second period T2 are alternately repeated has been explained, the first period T1 may be repeated consecutively for plural times, and then, the second period T2 may be repeated consecutively for plural times. A percentage of the first period T1 and a percentage of the second period T2 should be the same to avoid generation of a direct-current component. The liquid crystal to which the present invention is applied is not limited to the horizontally-aligned liquid crystal or the vertically-aligned liquid crystal. Similar effects can be achieved when the present invention is applied to a twisted nematic (TN) liquid crystal. Moreover, an object of modulation by the pulse width modulation may be a transmittance of light, an attenuation rate, or a birefringence $\Delta n$.

According to the embodiments described above, it is possible to reduce the waveform response. Moreover, it is possible to enhance resolution at a portion having an abrupt characteristic change of a liquid crystal without increasing power consumption. Furthermore, it is possible to correct a variation due to a characteristic change of a liquid crystal without causing excess of a withstand voltage of a segment driving circuit, nor increase of power consumption.

The present document incorporates by reference the entire contents of Japanese priority document, 2005-061580 filed in Japan on Mar. 4, 2005.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of statically driving a liquid-crystal optical-modulation device by applying an alternating electric field to a liquid crystal that is included in the liquid-crystal optical-modulation device and sandwiched by a common electrode and a segment electrode, the alternating electric field being produced by a drive signal that is pulse-width modulated based on modulation data, wherein the drive signal is a difference between a common signal and a segment signal that are applied to the common electrode and the segment electrode, respectively, in a first period in which the alternating electric field has a first polarity, the drive signal has a first ON-voltage and a first OFF-voltage, and in a second period in which the alternating electric field has a second polarity, the drive signal has a second ON-voltage and a second OFF-voltage that respectively differ from the first ON-voltage and the first OFF-voltage the absolute value of the first OFF-voltage and the absolute value of the second OFF-voltage are equal to an absolute value of a bias voltage that is a minimum voltage for changing a phase of light passing through the liquid crystal, a duration of the first ON-voltage and a duration of the second ON-voltage vary according to a phase shift amount of the light, the segment signal is a binary signal having a first segment voltage and a second segment voltage, and the common signal is a binary signal having a first common voltage higher than the first segment voltage by the bias voltage and a second common voltage lower than the second segment voltage by the bias voltage.

2. The method according to claim 1, wherein a polarity of the first ON-voltage is opposite to a polarity of the second ON-voltage, an absolute value of the first ON-voltage is equal to an absolute value of the second ON-voltage, a polarity of the first OFF-voltage is opposite to a polarity of the second OFF-voltage, an absolute value of the first OFF-voltage is equal to an absolute value of the second OFF-voltage, the polarity of the first ON-voltage is equal to the polarity of the first OFF-voltage, and the polarity of the second ON-voltage is equal to the polarity of the second OFF-voltage.

3. An apparatus for statically driving a liquid-crystal optical-modulation device by applying an alternating electric field to a liquid crystal that is included in the liquid-crystal optical-modulation device and sandwiched by a common electrode and a segment electrode, the alternating electric field being produced by a drive signal that is pulse-width modulated based on modulation data, the apparatus comprising:

a segment driving circuit that generates, based on the modulation data, a segment signal to be applied to the segment electrode;

a common driving circuit that generates, based on a polarity signal, a common signal to be applied to the common electrode;

a control circuit that provides a clock signal for timing control of pulse width modulation to the segment driving circuit, and provides the polarity signal to the common driving circuit; and an analog power-source circuit that includes a first direct-current power source that provides a first direct-current voltage for voltage amplification to the segment driving circuit, a second direct-current power source that provides a second direct-current voltage for voltage amplification to the common driving circuit, the second direct-current voltage being higher than the first direct-current voltage by a bias voltage, and a third direct-current power source that provides a third direct-current voltage for voltage amplification to the common driving circuit, the third direct-current voltage being lower than the first direct-current voltage by the bias voltage.

4. The apparatus according to claim 3, wherein the second direct-current power source and the third direct-current power source are a variable power source.

5. The apparatus according to claim 3, wherein the second direct-current power source and the third direct-current power source change the bias voltage based on a correction signal for correcting a variation due to a characteristic change of the liquid crystal so as to cancel the variation.

* * * * *